US006981709B2

(12) United States Patent
Saint

(10) Patent No.: US 6,981,709 B2
(45) Date of Patent: Jan. 3, 2006

(54) CURB MOUNTING MANEUVERABLE STROLLER

(76) Inventor: Nathanael Saint, 264 Mountz Rd., Morgantown, PA (US) 19543

( * ) Notice: Subject to any disclaimer, the term of this patent is extended or adjusted under 35 U.S.C. 154(b) by 22 days.

(21) Appl. No.: 10/868,291

(22) Filed: Jun. 14, 2004

(65) Prior Publication Data
US 2005/0006864 A1 Jan. 13, 2005

Related U.S. Application Data

(60) Provisional application No. 60/485,417, filed on Jul. 8, 2003.

(51) Int. Cl.
B62B 9/08 (2006.01)

(52) U.S. Cl. ............... 280/47.38; 280/47.2; 280/47.41; 280/47.12; 280/43; 280/642

(58) Field of Classification Search ............ 280/47.38, 280/304.1, 47.2, 47.41, 47.12, 43, 43.17, 280/642, 643, 647, 650; 188/20
See application file for complete search history.

(56) References Cited

U.S. PATENT DOCUMENTS

| 2,014,085 | A | * | 9/1935 | Kroll et al. | .................... 188/20 |
| 2,402,322 | A | * | 6/1946 | Flynn, Jr. | .................... 280/755 |
| 2,856,195 | A | * | 10/1958 | Ziebarth | ...................... 280/43 |
| 5,291,959 | A | * | 3/1994 | Malblanc | ..................... 180/11 |
| 5,653,460 | A | * | 8/1997 | Fogarty | ..................... 280/642 |
| 5,722,594 | A | * | 3/1998 | Farr et al. | ................... 280/643 |
| 6,360,836 | B1 | * | 3/2002 | Milano et al. | ............ 180/65.6 |
| 6,702,306 | B1 | * | 3/2004 | Ockwell | ................. 280/47.41 |
| 6,722,689 | B2 | * | 4/2004 | Kreamer | ..................... 280/642 |
| 6,827,356 | B2 | * | 12/2004 | Zhuang | .................... 280/32.7 |
| 2001/0004158 | A1 | * | 6/2001 | Lundh | ..................... 296/97.21 |
| 2004/0222607 | A1 | * | 11/2004 | Myers | ..................... 280/47.38 |

* cited by examiner

Primary Examiner—J. Allen Shriver
(74) Attorney, Agent, or Firm—Martin Fruitman

(57) ABSTRACT

The apparatus is a highly maneuverable, curb mounting double baby stroller. To improve maneuverability, the rear wheels are placed closer than usual to the front wheels, decreasing the wheelbase and providing greater leverage between the rear wheels and the rear handle. To compensate for the instability caused by the reduced wheelbase, a trailing support is provided behind the rear wheels. The trailing support may be a simple bar extension or have small wheels. The trailing support can be unlatched to permit it to pivot for lifting the front wheels to mount a curb.

5 Claims, 3 Drawing Sheets

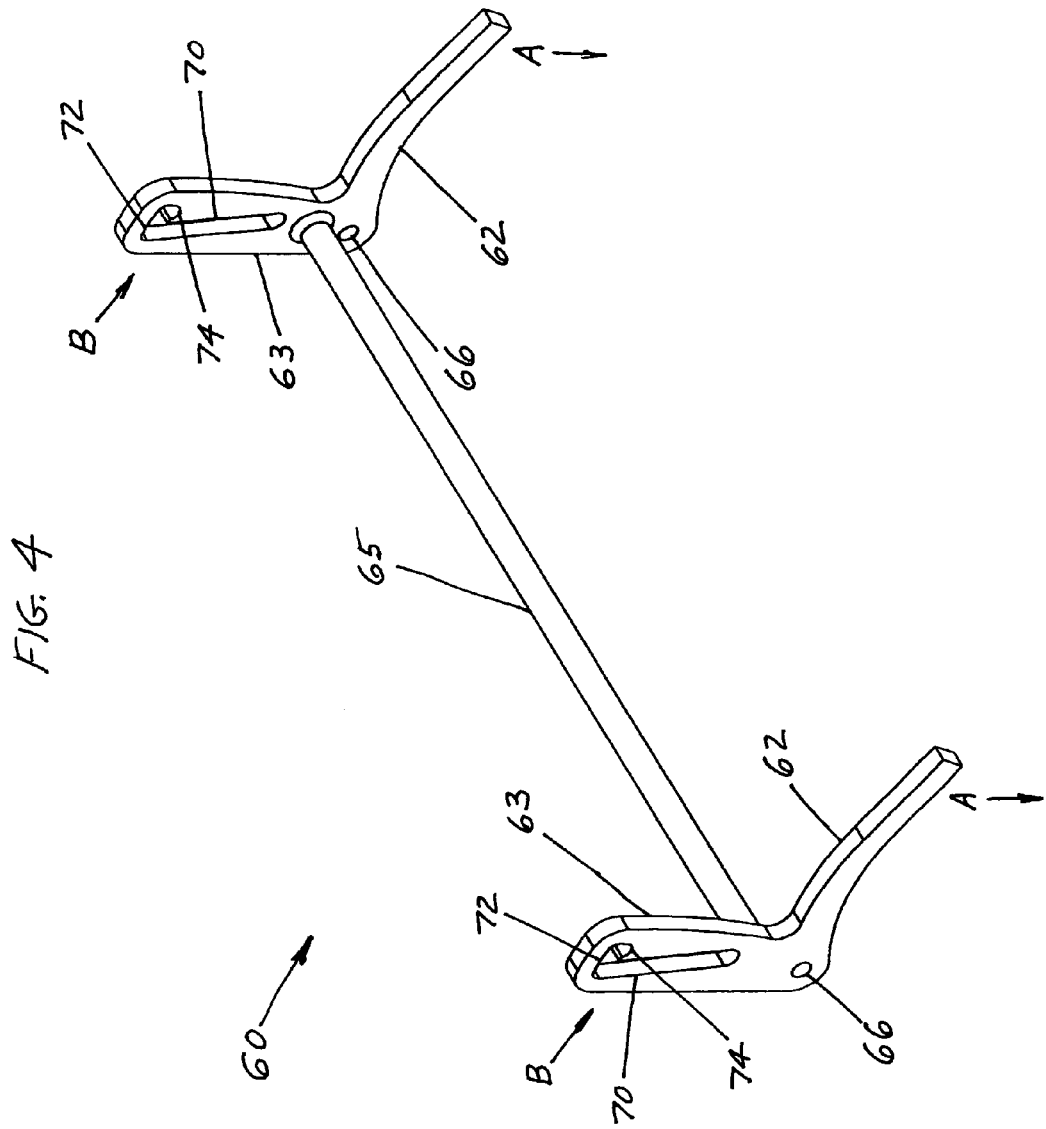

CURB MOUNTING MANEUVERABLE STROLLER

This application is based upon provisional patent application Ser. No. 60/485,417 filed Jul. 8, 2003.

BACKGROUND OF THE INVENTION

The invention deals generally with push type child transport vehicles such as baby strollers and similar vehicles and more specifically with a stroller or other similar vehicle that is easier to maneuver on flat surfaces and to raise over obstacles such as street curbs.

Baby strollers are well known and commonly used in our culture, but some of the problems in their use are not appreciated because they are not apparent to users of typical strollers. However, several of these problems are greatly exaggerated when a stroller is constructed and used to transport two children. Most such strollers are built so that the two children sit one in front of the other, and that significantly increases the length of the stroller. That extra length and the extra weight of a second child then raise problems that are not as severe with strollers used for a single child.

One such problem is limited maneuverability. The added length and weight make it much more difficult just to turn the stroller, but an even greater problem occurs when raising such a stroller over a street curb or even a door sill. It is almost impossible for an average person to lift a stroller with two children up and onto such an obstruction.

It would very beneficial to have a stroller that could be maneuvered easier than the typical double stroller and which could be moved over a curb or similar obstruction without lifting as much of the weight.

SUMMARY OF THE INVENTION

The present invention alleviates the problem of maneuvering a double stroller by changing the basic geometry of the stroller, and once the benefits of the new geometry are appreciated it becomes apparent that the geometry will also improve the maneuverability of single child strollers, baby carriages, and other similarly constructed vehicles.

The new geometry is essentially an increase in the ratio of the handle rearward extension to the wheelbase, however, since it is undesirable to increase the overall length of the stroller, in the preferred embodiment, this change of ratio is accomplished by reducing the wheelbase.

The wheelbase of a typical double stroller, the distance between the front and rear axles, usually measures between 27 and 29 inches, while the handle rearward extension, the horizontal distance between the center of the handle grip and the rear axle, typically ranges from 9 to 11 inches. Typical strollers have a handle rearward extension which is ⅓ the length of the wheelbase.

In the preferred embodiment of the stroller of the present invention the wheelbase is reduced to 22.13 inches while the handle rearward extension is increased to 17.31 inches. These changes increase the total of these two dimensions by only 0.58 inch, but produce a geometry in which the handle rearward extension is ¾ the length of the wheelbase, more than double the typical ratio. This larger ratio yields dramatic improvements in maneuverability and the ability to tilt the front of the stroller upward to overcome obstacles such as curbs.

These benefits are attained because the new geometry places the rear wheels much closer to the center of gravity of the stroller and to the front wheels. This reduces the weight on the front wheels making it easier for swivels on the front wheels to turn, and also means that there is less weight to lift off the ground in the curb mounting action of tilting the front wheels upward.

Perhaps the greatest benefit of the change in geometry is the increase in the lever arm upon which the handle operates. It is there where the larger ratio of the handle rearward extension to the wheelbase is most beneficial. The effect of any force that needs to be applied to the handle, whether horizontal to turn the stroller or vertical to lift the front wheels, is enhanced because the force is acting on an approximately 70 percent longer lever arm. For the stroller of the preferred embodiment with a typical full load of two children and 10 pounds of accessories, for both turning the stroller 90 degrees on its rear wheels and for pushing the handle down to raise the front wheels, the forces required are less than half those required for prior art strollers under similar conditions.

There is, however, a drawback to the reduced wheelbase of the stroller. The very fact that it takes less force to raise the front wheels of the stroller means that it is easier to accidentally tip such a stroller over backwards. In the preferred embodiment this danger is addressed by using a trailing support, essentially a stabilizer bar, with or without wheels, that extends some distance to the rear of the stroller's rear wheels just above the ground. Such a stabilizer bar will prevent the stroller from tipping backwards, but will act against both accidental actions and, unfortunately, one of the original goals of the new design, the action of tipping the front wheels up to mount a curve.

The design therefore requires one more feature, a latch and a release for the stabilizer bar that permits the stabilizer bar itself to pivot up when unlatched and thus permit the stroller to tip backwards a limited distance and permit the front wheels to be lifted up. In the preferred embodiment the latch release is activated by either of two foot pedals, so that the person pushing the stroller needs only to step on one of the pedals while pushing down on the handle. Once the foot pedal is released and the stroller front wheels are lowered, the stabilizer bar automatically latches and the stroller regains full stability. The condition of the stabilizer bar does not affect the turning ability of the stroller.

The present invention therefore provides a highly maneuverable and very stable stroller and requires only a simple additional action to permit it to mount a curb.

BRIEF DESCRIPTION OF THE DRAWINGS

FIG. 4 is a perspective view of the latch bracket of the trailing support of the preferred embodiment of the invention.

DETAILED DESCRIPTION OF THE INVENTION

Figure 1:
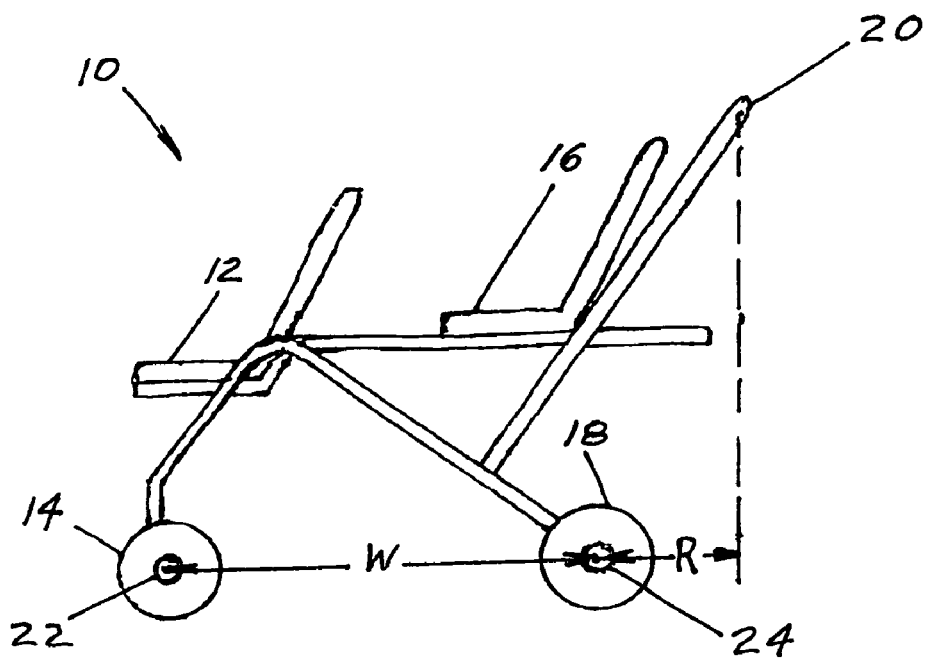
FIG. 1 is a schematic side view of a typical two child stroller of the prior art.

FIG. 1 is a schematic side view of a typical two child stroller 10 of the prior art in which two children can be accommodated. Forward seat 12 is located approximately over front swiveling wheels 14 (only one of which is shown), and rear seat 16 is located slightly forward of rear wheels 18 (only one of which is shown). Handle 20 is conventionally located to the rear and slightly above the top of rear seat 16. The wheelbase of stroller 10, the distance between centers 22 of front wheels 14 and centers 24 of rear wheels 18, is designated by dimension W. In typical prior art strollers this wheelbase usually measures between 27 and 29 inches. Handle rearward extension R, the horizontal distance between centers 24 of rear wheels 18 and the location of handle 20 typically ranges from 9 to 11 inches in prior art strollers.

Such dimensions yield typical strollers having a handle rearward extension that is ⅓ the length of the wheelbase. However, it is of significance that handle rearward extension R furnishes a lever arm of only approximately 10 inches to maneuver or lift the front end of such prior art strollers. Since the total weight of a stroller with two children aboard along with the accessories needed for travel with children can easily reach 110 pounds, this makes such strollers very difficult to control. In fact, under such circumstances, the weight on the front wheels alone can be fifty pounds, and for tilting the front wheels upward to mount a curb by pushing the handle down, a downward force of over 100 pounds is required. This is simply too much to ask of many parents.

Figure 2:
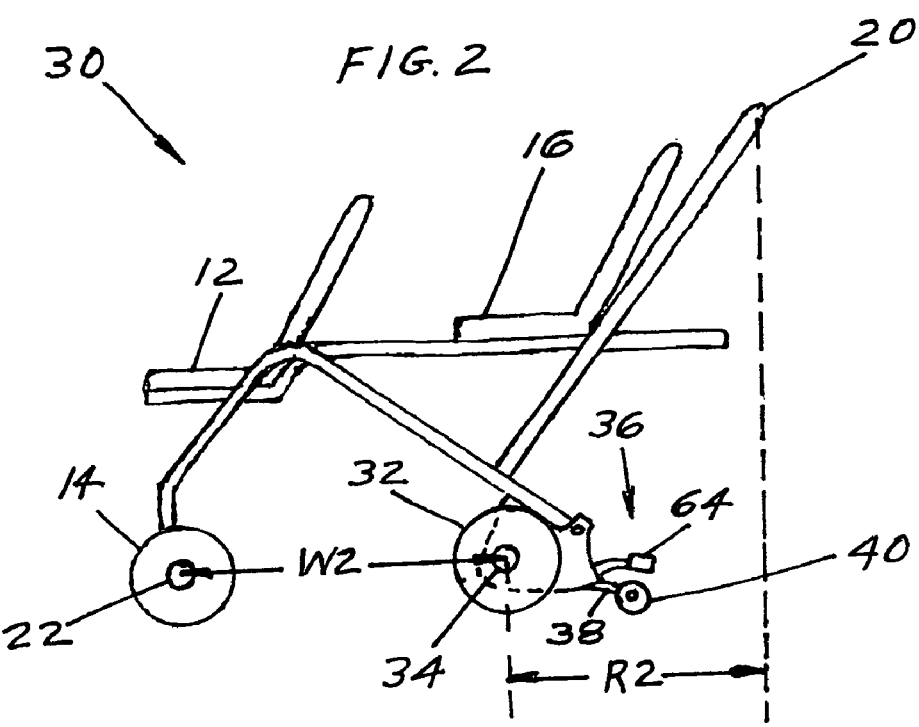
FIG. 2 is a schematic side view of the stroller of the preferred embodiment.

FIG. 2 is a schematic side view of stroller 30 of the preferred embodiment depicting the differences of the present invention from the prior art stroller shown directly above in FIG. 1. The same identifying numbers are used for all parts in FIG. 2 which are unchanged from FIG. 1 and in the same location.

The essential difference between preferred embodiment stroller 30 and the prior art is the relocation of rear wheels 32 of stroller 30 to a location closer to front wheels 14. This not only reduces wheelbase W2, but also increases handle rearward extension R2. In the preferred embodiment wheelbase W2 is reduced to 22.13 inches and handle rearward extension R2 is increased to 17.31 inches. This relationship can be accomplished either, as in the preferred embodiment of the invention, by reducing the wheelbase while maintaining the handle in essentially the same location, or by increasing handle rearward extension R2 and accepting a longer vehicle.

This rearrangement has some very beneficial results. One is that rear wheels 32, which are the pivot point for turning any stroller, are now located closer to the center of mass. This also reduces the weight on the front wheels permitting the swivels on the front wheels to turn much easier. The weight on the front wheels of preferred embodiment stroller 30 is 31.5 pounds compared to the prior art stroller front wheel weight of 50 pounds. This makes the stroller much easier to steer.

The change in wheelbase and handle rearward extension dimensions also dramatically changes the relationship of handle rearward extension R2 to wheelbase W2. Whereas in the typical prior stroller the handle rearward extension length is about ⅓ of the wheelbase, in the preferred embodiment handle rearward extension R2 is greater than ¾ the length of the wheelbase. In fact, the desirable dimensions for wheelbase W2 and handle rearward extension R2 are best defined by the comparative lengths of the two dimensions. For the purpose of the present invention the handle rearward extension should be at least 0.5 times the length of the wheelbase of the vehicle upon which it is used.

This increase in the length of handle rearward extension R2 relative to the length of wheelbase W2 provides a very beneficial benefit of the invention, because it increases the lever arm with which the handle operates and reduces the lever arm upon which the weight of the front wheels act. Thus, the effect of any force that needs to be applied to the handle, whether horizontal to turn the stroller or vertical to lift the front wheels, is enhanced because, in the preferred embodiment, the force on the handle is acting on an approximately 70 percent longer lever arm while the weight on the front wheels is acting with a 78 percent shorter lever arm. For the stroller of the preferred embodiment with a typical full load of two children and 10 pounds of accessories, for both turning the stroller 90 degrees on its rear wheels and for pushing the handle down to raise the front wheels, the forces required are less than half those required for prior art strollers under similar conditions.

The table below shows the dramatic changes in test results between a typical prior art stroller and stroller 30 of the preferred embodiment.

|  | Prior Art | Preferred Embodiment |
|---|---|---|
| Wheelbase (inches) | 28.25 | 22.13 |
| Handle rearward extension (inches) | 10.61 | 17.31 |
| Rearward Ext./Wheelbase Ratio | 0.376 | 0.782 |
| Front wheel weight (pounds) | 50 | 31.5 |
| Handle force for 90° turn (pounds) | 20.81 | 9.60 |
| Handle force for curb mount (pounds) | 105 | 41 (released) |
| Handle force for rear tipping (pounds) | 105 | 125 (latched) |

Unfortunately, however, the reduced forces on the handle also suggest a safety problem. Since it takes less force to raise the front wheels 14 of stroller 30, it is also easier to accidentally tip such a stroller over backwards. In the preferred embodiment this danger is addressed by using trailing support 36 described in greater detail in regard to FIG. 3. Trailing support 36 is essentially stabilizer bars 38, with or without trailing wheels 40. Trailing support 36 extends some distance to the rear of rear wheels 32 of stroller 30 and is located just far enough above the support surface to put trailing wheels 40 in contact with the support surface. If trailing support 36 is used without wheels it is located just high enough to prevent contact with the support surface. Trailing support 36 prevents the stroller from tipping backwards, but will, of course, act against both accidental actions and, also one of the original goals of the new design, the facilitated action of tipping the front wheels up to mount a curve. Trailing support 36 therefore includes a latch and release mechanism described in detail in regard to FIG. 3.

Figure 3:
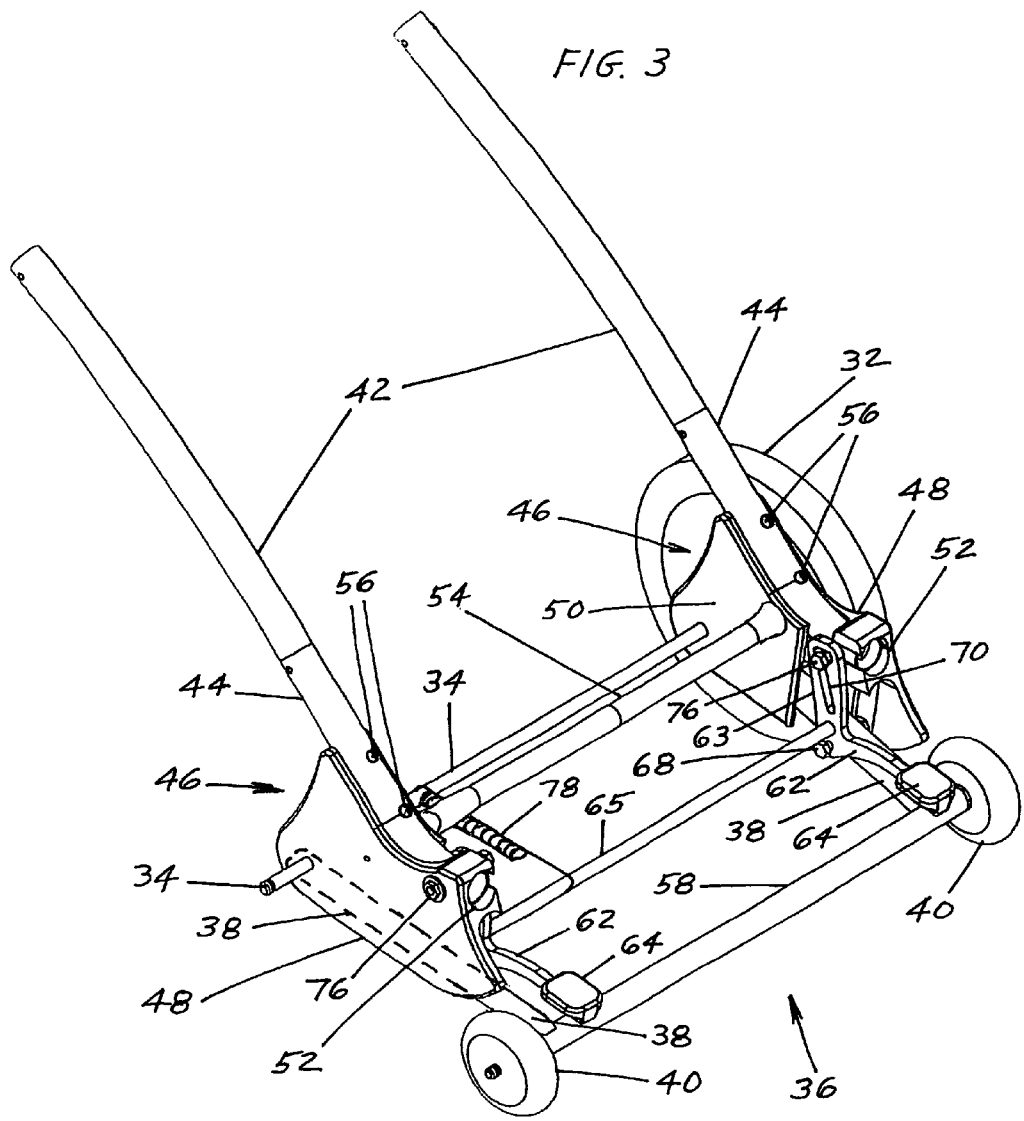
FIG. 3 is a perspective view of the trailing support, stabilizer bar, and rear axle of the stroller of the preferred embodiment of the invention.

FIG. 3 is a perspective view of trailing support 36 that includes stabilizer bars 38 and rear axle 34 of stroller 30 of the preferred embodiment of the invention. Trailing support 36 is shown with one rear wheel 32 removed from rear axle 34 to better view the structure of trailing support 36, however, the structure near both wheels 32 is the same except for the changes required because of the location of the two wheels on opposite ends of axle 34.

For the preferred embodiment stroller 30, the particular construction and components of trailing support 36 have been at least partly determined by its attachment to prior art stroller 10. Thus, trailing support 36 is constructed to be attachable to the rear legs by means of curved leg extensions 44.

Mounting brackets 46, constructed with outside parts 48 and inside parts 50, attach trailing support 36 to rear legs 42, and include cylindrical holes 52 to aid in stabilizing trailing support 36 relative to rear legs 42. Rear axle 34 penetrates and is attached to both outside parts 48 and inside parts 50 of mounting brackets 46. Spacing rod 54, which is attached to inside parts 50 along with screws 56, which penetrate leg extensions 44 and attach to mounting brackets 46, aid in making trailing support 36 into a rigid structure.

The basic function of trailing support 36 is performed by stabilizer bars 38 which, even by themselves, prevent stroller 30 from tipping over backwards. However, the function of stabilizer bars 38 is facilitated by adding trailing wheels 40, and the structure is strengthened by the addition of trailing bar 58.

As previously described, the function of trailing support 36 is to prevent stroller 30 from tipping over backwards, but this also prevents stroller 30 from being intentionally tipped backwards for mounting curbs. An apparatus for latching and releasing trailing support 36 is therefore required.

The first part of the latching and release action is accomplished by extending stabilizer bars 38 forward to rear wheel axle 34 and using rear wheel axle 34 as a pivot point for stabilizer bars 38. Clearly, this permits stabilizer bars 38 to pivot upward as handle 20 of stroller 30 is pushed down so that front wheels 14 are raised. Other pivot points could, of course, be used, but rear wheel axle is advantageously located to furnish a relatively long turning radius for stabilizer bars 38. In the preferred embodiment latching brackets 62 and release foot pedals 64 then provide the ability to lock stabilizer bars 38 in their lowered position, as shown in FIG. 3, and to release them to permit curb mounting.

The operation of latching assembly 60 of the preferred embodiment is best understood with reference to FIG. 3 and it is shown with greater clarity in FIG. 4. Latching brackets 62 are two "L" shaped structures that resemble golf putters, and include near-vertical sections 63. Latching brackets 62 are located at the inside surfaces of stabilizer bars 38. Spacing bar 65 is attached between latching brackets 62 to establish the distance between them and to assure that they move in unison. Holes 66 located near the corner of the angle of each latching bracket 62 are penetrated by bolts 68 that act as pivot points for latching brackets 62, and bolts 68 are also attached to the stabilizer bar 38 adjacent to each latching bracket 62. Thus, when either of the release foot pedals 64 located on the ends of latching brackets 62 (see FIGS. 2 and 3) is pushed down in the direction indicated by arrows A, the other ends of both latching bracket sections 63 move toward the rear of stroller 30 as indicated by directional arrows B.

Each latching bracket 62 includes a slot 70 extending along the length of section 63 and a transverse slot 72 at the upper end of slot 70. Transverse slot 72 includes a sloped depression 74 at its rearmost end. As seen in FIG. 3, bolts 76 fit through slots 70 and 72 and are attached to mounting brackets 46.

Thus, when sections 63 are positioned to place bolts 76 within slot 70, slot 70 and trailing supports 36 are released and can move upward, but when sections 63 are positioned so that bolts 76 are within sloped depressions 74, no upward movement of slots 70 is possible and trailing support 36 is latched in its lowest position. The difference between latching and release of trailing support 36 is therefore dependent upon the position of bolts 76 within transverse slot 72 and whether section 63 is moved in direction B toward the rear of stroller 30 for release or in the direction opposite of direction B toward the front of stroller 30 for latching.

The rearward motion of sections 63 of latching brackets 62 is controlled by release pedals 64. When an operator pushes down on either release pedal 64, both latching brackets 62 pivot (clockwise in the view of FIG. 3) and sections 63 move toward the rear of the stroller permitting slots 70 to move upward past bolts 76. The rear of the stroller can then be pushed down to raise the front wheels.

Then, when the operator stops pushing on release pedal 64, spring 78, which is stretched between rear axle 34 and spacing bar 65, pulls spacing bar 65 and both latching brackets counterclockwise. Therefore, when the stroller is located on a flat surface and the weight of trailing support 36 lowers trailing wheels 40, slot 70 moves down along bolt 76, and when the top of slot 70 reaches bolt 76 the counterclockwise force of spring 78 on latching bracket 62 moves sloped depression 74 of transverse slot 72 into position around bolt 76 and latches trailing support 36 in its lowest position. Stroller 30 can then be safely used without the danger of tipping backward.

The invention therefore provides a stroller that can mount a curb and be maneuvered more easily than prior art strollers and is actually more difficult to accidentally tip rearward than prior art strollers (as noted in the table on page 8).

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the apparatus of the invention can be used on push type child transport vehicles other than strollers, and can apply to vehicles for only one child and vehicles with only a single front wheel. Moreover, other latch and release mechanisms can be devised, other specific dimensions for wheelbases and for handle rearward extensions are useable, and other configurations of trailing supports could be used, including using one or more wheels or using no wheels at all.

What is claimed as new and for which Letters Patent of the United are desired to be secured is:

1. In a child transport vehicle of the type that includes at least one weight bearing front wheel engaging a surface upon which the vehicle is operated when the vehicle is in normal use, two rear wheels mounted at opposite ends of a rear axle, a structure to hold at least one child, and a handle located behind the rear axle and used for pushing the vehicle, the improvement comprising:

the rear axle located between the handle and the front wheel in a location such that the horizontal distance between the rear axle and the handle is at least 0.5 times the horizontal distance between the front wheel and the rear axle; and a trailing support located behind the rear axle; and further including the trailing support located behind the rear axle and held in a latched position adjacent to and above the surface upon which the vehicle is operating in order to prevent the vehicle from tipping over backwards, an apparatus locking the trailing support in the latched position, and a release mechanism that permits an operator to release the trailing support from the latched position so that the trailing support moves and permits the handle to be pushed down sufficiently to raise the front wheel over a predetermined obstacle.

2. The vehicle of claim 1 further including at least one release foot pedal operable by the operator to operate the release mechanism.

3. The vehicle of claim 1 further including at least one wheel attached to the trailing support with the wheel in contact with the surface upon which the vehicle is operated when the vehicle is in normal use.

4. A child transport vehicle comprising:
   a structure for holding at least one child;
   at least one weight bearing front wheel engaging a surface upon which the vehicle is operated when the vehicle is in normal use;
   two rear wheels mounted at opposite ends of a rear axle;
   a handle located behind the rear axle and used for pushing the vehicle;
   wherein the rear axle is located between the handle and the front wheel in a location such that the horizontal distance between the rear axle and the handle is at least 0.5 times the horizontal distance between the front wheel and the rear axle; and
   a trailing support located behind the rear axle; and further including
   the trailing support located behind the rear axle and held in a latched position adjacent to and above the surface upon which the vehicle is operating in order to prevent the vehicle from tipping over backwards;
   an apparatus locking the trailing support in the latched position; and
   a release mechanism that permits an operator to release the trailing support from the latched position so that the trailing support moves and permits the handle to be pushed down sufficiently to raise the front wheel over a predetermined obstacle.

5. The vehicle of claim 4 further including at least one release foot pedal operable by the operator to operate the release mechanism.

* * * * *